Patented June 6, 1944

2,350,324

UNITED STATES PATENT OFFICE 2,350,324

PARASITICIDAL COMPOSITION

Gerald H. Coleman, Fred W. Fletcher, and George E. Lynn, Midland, Mich., assignors to The Dow Chemical Company, Midland, Mich., a corporation of Michigan No Drawing. Application July 25, 1941, Serial No. 404,044

10 Claims. (Cl. 167—24)

This invention concerns parasiticidal compositions and is particularly directed to compositions adapted for combating red spiders, aphids, flies, mosquitoes, and the like.

Extracts of such insecticidal plant products as pyrethrum flowers, derris, cube, timbo, and barbasco are widely used for the control of insect pests. These toxicants are employed in petroleum distillate sprays, in water dispersions, and in mixture with inert diluents as dusts. Pyrethrin-containing compositions have a quick paralyzing action on flies and the like, but give a relatively low kill as compared to the per cent knockdown. With rotenone-containing compositions, a high moribund kill is generally obtained, although a considerable period of time is required to destroy insect pests. The plant extracts as a class are unstable to heat and light, and lose their effectiveness to a considerable degree upon storage.

We have discovered that certain N-substituted amids of 6-cyclohexyl-Δ2-hexenoic acid are effective substitutes for extracts of insecticidal plant products in parasiticidal compositions. The compounds which are particularly effective are those having the following formula

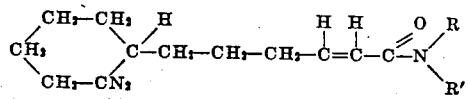

wherein R represents a cycloalkyl, alkyl, alkenyl, or aralkyl radical, or an aromatic radical of the benzene series, R' represents aryl or hydrogen, and R' and R jointly may constitute an endomethylene group chain broken by a hetero-atom, such as oxygen and sulfur, to form with the nitrogen a heterocyclic ring. These compounds may be incorporated in the standard type parasiticidal compositions and compare favorable in toxic effect with the plant extracts. They have the added advantage of being substantially colorless and more stable to heat, light and air than are pyrethrin and rotenone. Furthermore, small amounts of these amids may be added to insecticidal compositions containing such toxic principals as pyrethrin and rotenone to obtain improved parasiticidal compositions which are more stable to heat and light and have a greater paralyzing effect and greater lethal effect on parasites than do the original plant extract containing compositions. By employing these amids to fortify such known compositions, economies are effected both in increased efficiency and by reducing the amount of pyrethrin or rotenone required.

When the new amids are used alone, a concentration of from about 2 to 10 per cent by weight in spray compositions is satisfactory. For use in stabilizing and/or fortifying common spray compositions comprising pyrethrin or rotenone, the amids are preferably employed in amount of from about 0.5 to 5 grams per 100 milliliters of the spray solution. When used in dusts or in aqueous dispersions, from about 0.5 to about 25 per cent by weight of the amid may be employed depending on the particular use for which the composition is desired, and whether or not it is to be used as such, or employed as a concentrate in the preparation of more dilute compositions.

The amids with which the present invention is concerned as parasiticidal toxicants are prepared by reacting 6-cyclohexyl-Δ2-hexenoic acid with a suitable primary or secondary amine, preferably in the presence of acetic anhydride. Substantially equimolar proportions of the amine and acid have been found to give the desired amid in good yield. The reaction may be carried out at such a temperature as results in the distillation of acetic acid as formed. When the reaction is complete, the crude mixture may be fractionally distilled under reduced pressure to obtain the amid product in substantially pure form.

Another method which may be employed in the preparation of these compounds comprises reacting a lower alkyl ester of cyclohexyl-hexenoic acid with a suitable amine. When operating according to this procedure, it is generally sufficient to heat the reactants together for several hours or to mix the reactants and allow them to stand for a period varying from a week to several months to accomplish the reaction. If desired, a diluent such as absolute ethanol may be employed in the reaction mixture. The preparation and properties of a number of the amids are described in a co-pending application by Gerald H. Coleman and Wesley D. Schroeder, Serial No. 400,862, filed July 2, 1941.

The 6-cyclohexyl-Δ2-hexenoic acid employed in the preparation of the amids may be prepared by the oxidation of cyclohexanol. In a representative preparation 5 mols of anhydrous sodium hydroxide, 5 mols of anhydrous potassium hydroxide, and 0.43 mol of caproic acid were mixed and heated to fusion. The fused mixture was stirred continuously and maintained at about 300° C. while 13.28 mols of cyclohexanol was added portionwise thereto. The mixture was then cooled, dissolved in water, and steam-distilled to remove traces of cyclohexanol and low-boiling by-products. The residual aqueous layer was evaporated to about 3 liters volume and acidified with hydrochloric acid to liberate the organic acid reaction products as a water-immiscible layer. This layer was separated and fractionally distilled under vacuum whereby there was obtained 2.89 mols of caproic acid, 0.887 mol of 4-cyclohexyl-butanoic acid, and 4.113 mols of 6-cyclohexyl-Δ2-hexenoic acid. The latter compound boiled at 195°–198° C. at 38 millimeters pressure, had a specific gravity of 0.986 at 20°/4° C., and froze at approximately −11° C.

The method employed in determining the effectiveness of certain representative compositions against houseflies as set forth in the following examples was substantially that described in Soap, 8, No. 4, 1932 and known as the Peet-Grady method. The control pyrethrin solution employed in the example consisted of the extract of the toxic principal from 1 pound of pyrethrum flowers dissolved in 1 U. S. gallon of a petroleum distillate having a boiling range of 345°–508° F. and a flash point of 137° F.

The invention is illustrated by the following examples:

*Example 1*

2.5 grams of N-(6-cyclohexyl-Δ2-hexenoyl)-morpholine boiling at 191.5°–197° C. at 1 millimeter pressure and having a specific gravity of 1.028 at 25°/25° C. was dissolved in sufficient of the petroleum distillate described above to give 100 milliliters of test solution. This solution was employed as a spray composition against five-day old houseflies according to the Peet-Grady method and found to give a knockdown of 99.4 per cent in 10 minutes, and a kill of 43.6 per cent in 24 hours.

In a similar determination N-normalbutyl-N-phenyl-6-cyclohexyl-Δ2-hexenamid boiling at 195°–210° C. at 2 millimeters pressure and having a specific gravity of 0.980 at 25°/25° C. gave a kill of 21.4 per cent of the flies in 24 hours. In similar determinations N-cyclohexyl-6-cyclohexyl-Δ2-hexenamid boiling at 222.5°–224° C. at 2 millimeters pressure and melting at 50°–53° C. gave a kill of 27.1 per cent of the test insects; and N-normalbutyl-6-cyclohexyl-Δ2-hexenamid boiling at 180°–182° C. at 1 millimeter pressure and having a specific gravity of 0.933 at 25°/4° C. gave a kill of 12.7 per cent of the flies in 24 hours.

In several determinations made during the testing of the foregoing compounds, the control pyrethrin solution gave 99–100 per cent knockdown and kills ranging from 45.4 to 56.3 per cent in 24 hours.

*Example 2*

Fortified fly spray compositions were prepared by mixing representative amids with pyrethrin solution. In these compositions 2.5 grams of the amid, 50 milliliters of the pyrethrin control solution, and 50 milliliters of the standard petroleum distillate were mixed together to form fly sprays which were tested according to the Peet-Grady procedure. In three tests, the mixture containing N-normalbutyl-N-phenyl-6-cyclohexyl-Δ2-hexenamid was found to give an average knockdown of 99.7 per cent and a kill of 74.8 in 24 hours. The N-cyclohexyl-6-cyclohexyl-Δ2-hexenamid mixture with pyrethrins gave a knockdown of 99.7 per cent in 10 minutes and a kill of 69.4 in 24 hours. The N-normalbutyl-6-cyclohexyl-Δ2-hexenamid containing mixture gave a knockdown of 100 per cent in 10 minutes and a kill of 71.9 per cent in 24 hours. In four control determinations, a mixture of 50 milliliters of the control pyrethrin solution and 50 milliliters of petroleum distillate gave an average knockdown of 99.7 in 10 minutes and an average kill of 36.2 per cent in 24 hours. The mixtures appeared to be more stable than the unmodified pyrethrin solution.

Likewise, the cyclohexyl-hexenamids may be employed to fortify and stabilize extracts of derris, cube, timbo, barbasco, and the like. Besides petroleum distillates, other organic solvents such as benzene, ethylene chloride, hydrogenated naphthalene, butyl alcohol, ketones, etc. may be employed. The phrase "non-corrosive organic solvent" as employed in certain of the following claims refers to any organic solvent material unreactive with and capable of dissolving the toxicants described and non-injurious to the skin and general health of humans.

In certain instances it may be desirable to employ the amids as toxicants in emulsions or as simple water dispersions along with soap or other wetting, emulsifying, or detergent agents and water. Various perfumes or coloring agents may also be incorporated into such compositions.

In other embodiments of the invention, inert solid carriers may be mixed with the amids to form concentrates adapted to be subsequently employed in spray and dust compounds. Similarly, the amids may be compounded directly with a solid carrier to form finely divided dust mixtures adapted to be employed without further modifications in the control of agricultural pests. Such dust mixtures may be prepared by dissolving or dispersing the toxicant in a suitable solvent, e. g. acetone, methanol, ethanol, etc., wetting the finely divided inert carrier with the resultant product, and thereafter evaporating the solvent out of the mixture.

Representative of the finely divided solid carriers which may be employed in the compositions as described above are diatomaceous earth, bentonite, talc, volcanic ash, gypsum, walnut shell flour, fuller's earth, kieselguhr, etc. Suitable wetting and dispersing agents include sodium lauryl sulfate, dried sulfite waste liquor, salts of alkyl-phenylphenolsulfonic acids, hydroxy-alkyl ethers of phenols, and the like.

Among the amids which may be employed substantially as set forth above are N-allyl-6-cyclohexyl-Δ2-hexenamid boiling at 165°–167° C. at 1 millimeter pressure and having a density of 0.951 gram per milliliter at 25° C.; N-phenyl-6-cyclohexyl-Δ2-hexenamid boiling at 275° C. at 8 millimeters pressure and melting at 70°–72° C.; N - (4 - phenyl -phenyl) -6-cyclohexyl-Δ2-hexenamid melting at 136°–138° C.; N-(2-phenoxyphenyl)-6-cyclohexyl-Δ2-hexenamid boiling at 325°–335° C. at 20 millimeters pressure and having a specific gravity of 1.082 at 25°/25° C.; N-normalamyl-6-cyclohexyl-Δ2-hexenamid boiling at 175°–177° C. at 1.5 millimeters pressure and having a density of 0.930 grams per milliliter at 25° C.; N-ethyl-6-cyclohexyl-Δ2-hexenamid boiling at 165°–167° C. at 1.5 millimeters pressure and having a density 0.944 gram per milliliter at 25° C.; N-benzyl-6-cyclohexyl-Δ2-hexenamid; n-(6-cyclohexyl-Δ2-hexenoyl)-thiomorpholine; N-tertiarybutyl-N-tolyl-6-cyclohexyl-Δ2-hexenamid; N-isobutyl-N-(2 - methyl - 5 - isopropyl-phenyl)-6-cyclohexyl-Δ2-hexenamid; N-cyclohexyl-N-phenyl-6-cyclohexyl-Δ2-hexenamid; and N,N-diphenyl-6-cyclohexyl-Δ2-hexenamid.

Other modes of applying the principle of our invention may be employed instead of those explained, change being made as regards the materials or the amounts thereof employed, provided the compositions defined by any of the following claims or their equivalent be employed.

We therefore particularly point out and distinctly claim as our invention:

1. An insecticidal composition comprising as an active toxicant a compound having the formula $$CH_3\diagdown \atop CH_2 \diagup \overset{CH_2-CH_2}{\underset{CH_2-CH_2}{\diagdown \diagup}} \overset{H}{\underset{}{C}}-CH_2-CH_2-CH_2-\overset{H}{\underset{}{C}}=\overset{H}{\underset{}{C}}-\overset{O}{\underset{}{C}}-N\diagup^{R}_{R'}$$

wherein R represents a member of the class consisting of the cycloalkyl, alkyl, alkenyl, and aralkyl radicals, and aromatic radicals of the benzene series, R' is selected from the group consisting of aryl and hydrogen, and R' and R jointly may constitute an endomethylene group chain broken by a hetero-atom to form with the nitrogen a heterocyclic ring, and a carrier therefor.

2. An insecticidal composition comprising as an active toxicant a compound having the formula $$CH_3\diagdown \atop CH_2 \diagup \overset{CH_2-CH_2}{\underset{CH_2-CH_2}{\diagdown \diagup}} \overset{H}{\underset{}{C}}-CH_2-CH_2-CH_2-\overset{H}{\underset{}{C}}=\overset{H}{\underset{}{C}}-\overset{O}{\underset{}{C}}-N\diagup^{R}_{H}$$

wherein R represents a member of the class consisting of cycloalkyl, alkyl, alkenyl, and aralkyl radicals, and aromatic radicals of the benzene series, and a carrier therefor.

3. A liquid insecticidal composition having dispersed therein as an active toxicant a compound having the formula $$CH_3\diagdown \atop CH_2 \diagup \overset{CH_2-CH_2}{\underset{CH_2-CH_2}{\diagdown \diagup}} \overset{H}{\underset{}{C}}-CH_2-CH_2-CH_2-\overset{H}{\underset{}{C}}=\overset{H}{\underset{}{C}}-\overset{O}{\underset{}{C}}-N\diagup^{R}_{R'}$$

wherein R represents a member of the class consisting of the cycloalkyl, alkyl, alkenyl, and aralkyl radicals, and aromatic radicals of the benzene series, R' is selected from the group consisting of aryl and hydrogen, and R' and R jointly may constitute an endomethylene group chain broken by a hetero-atom to form with the nitrogen a heterocyclic ring.

4. An insecticidal spray comprising a non-corrosive organic solvent having dissolved therein as a toxic ingredient a compound having the formula $$CH_3\diagdown \atop CH_2 \diagup \overset{CH_2-CH_2}{\underset{CH_2-CH_2}{\diagdown \diagup}} \overset{H}{\underset{}{C}}-CH_2-CH_2-CH_2-\overset{H}{\underset{}{C}}=\overset{H}{\underset{}{C}}-\overset{O}{\underset{}{C}}-N\diagup^{R}_{R'}$$

wherein R represents a member of the class consisting of the cycloalkyl, alkyl, alkenyl, and aralkyl radicals, and aromatic radicals of the benzene series, R' is selected from the group consisting of aryl and hydrogen, and R' and R jointly may constitute an endomethylene group chain broken by a hetero-atom to form with the nitrogen a heterocyclic ring.

5. An insecticidal spray comprising a non-corrosive organic solvent having dissolved therein as a toxic ingredient a compound having the formula $$CH_3\diagdown \atop CH_2 \diagup \overset{CH_2-CH_2}{\underset{CH_2-CH_2}{\diagdown \diagup}} \overset{H}{\underset{}{C}}-CH_2-CH_2-CH_2-\overset{H}{\underset{}{C}}=\overset{H}{\underset{}{C}}-\overset{O}{\underset{}{C}}-N\diagup^{R}_{H}$$

wherein R represents a member of the class consisting of cycloalkyl, alkyl, alkenyl, and aralkyl radicals, and aromatic radicals of the benzene series.

6. An insecticidal composition comprising a product selected from the class consisting of the extracts of pyrethrin and rotenone bearing plants, and as an added toxicant a compound having the formula $$CH_3\diagdown \atop CH_2 \diagup \overset{CH_2-CH_2}{\underset{CH_2-CH_2}{\diagdown \diagup}} \overset{H}{\underset{}{C}}-CH_2-CH_2-CH_2-\overset{H}{\underset{}{C}}=\overset{H}{\underset{}{C}}-\overset{O}{\underset{}{C}}-N\diagup^{R}_{R'}$$

wherein R represents a member of the class consisting of the cycloalkyl, alkyl, alkenyl, and aralkyl radicals, and aromatic radicals of the benzene series, R' is selected from the group consisting of aryl and hydrogen, and R' and R jointly may constitute an endomethylene group chain broken by a hetero-atom to form with the nitrogen a heterocyclic ring.

7. An insecticidal composition comprising pyrethrin and as an added toxicant a compound having the formula $$CH_3\diagdown \atop CH_2 \diagup \overset{CH_2-CH_2}{\underset{CH_2-CH_2}{\diagdown \diagup}} \overset{H}{\underset{}{C}}-CH_2-CH_2-CH_2-\overset{H}{\underset{}{C}}=\overset{H}{\underset{}{C}}-\overset{O}{\underset{}{C}}-N\diagup^{R}_{R'}$$

wherein R represents a member of the class consisting of the cycloalkyl, alkyl, alkenyl, and aralkyl radicals, and aromatic radicals of the benzene series, R' is selected from the group consisting of aryl and hydrogen, and R' and R jointly may constitute an endomethylene group chain broken by a hetero-atom to form with the nitrogen a heterocyclic ring.

8. An insecticidal composition comprising pyrethrin and as an added toxicant a compound having the formula $$CH_3\diagdown \atop CH_2 \diagup \overset{CH_2-CH_2}{\underset{CH_2-CH_2}{\diagdown \diagup}} \overset{H}{\underset{}{C}}-CH_2-CH_2-CH_2-\overset{H}{\underset{}{C}}=\overset{H}{\underset{}{C}}-\overset{O}{\underset{}{C}}-N\diagup^{R}_{H}$$

wherein R represents a member of the class consisting of cycloalkyl, alkyl, alkenyl, and aralkyl radicals, and aromatic radicals of the benzene series.

9. An insecticidal spray comprising a non-corrosive organic solvent having dissolved therein pyrethrin and as an added toxicant a compound having the formula $$CH_3\diagdown \atop CH_2 \diagup \overset{CH_2-CH_2}{\underset{CH_2-CH_2}{\diagdown \diagup}} \overset{H}{\underset{}{C}}-CH_2-CH_2-CH_2-\overset{H}{\underset{}{C}}=\overset{H}{\underset{}{C}}-\overset{O}{\underset{}{C}}-N\diagup^{R}_{R'}$$

wherein R represents a member of the class consisting of the cycloalkyl, alkyl, alkenyl, and aralkyl radicals, and aromatic radicals of the benzene series, R' is selected from the group consisting of aryl and hydrogen, and R' and R jointly may constitute an endomethylene group chain broken by hetero-atom to form with the nitrogen a heterocyclic ring.

10. An insecticidal spray comprising a non-corrosive organic solvent having dissolved therein pyrethrin and as an added toxicant a compound having the formula $$CH_3\diagdown \atop CH_2 \diagup \overset{CH_2-CH_2}{\underset{CH_2-CH_2}{\diagdown \diagup}} \overset{H}{\underset{}{C}}-CH_2-CH_2-CH_2-\overset{H}{\underset{}{C}}=\overset{H}{\underset{}{C}}-\overset{O}{\underset{}{C}}-N\diagup^{R}_{H}$$

wherein R represents a member of the class consisting of cycloalkyl, alkyl, alkenyl, and aralkyl radicals, and aromatic radicals of the benzene series.

GERALD H. COLEMAN.
FRED W. FLETCHER.
GEORGE E. LYNN.